April 29, 1952 J. LEDWINKA ET AL 2,595,212
VEHICLE BODY, ESPECIALLY FOR RAIL CARS
Filed Jan. 15, 1945 5 Sheets-Sheet 2
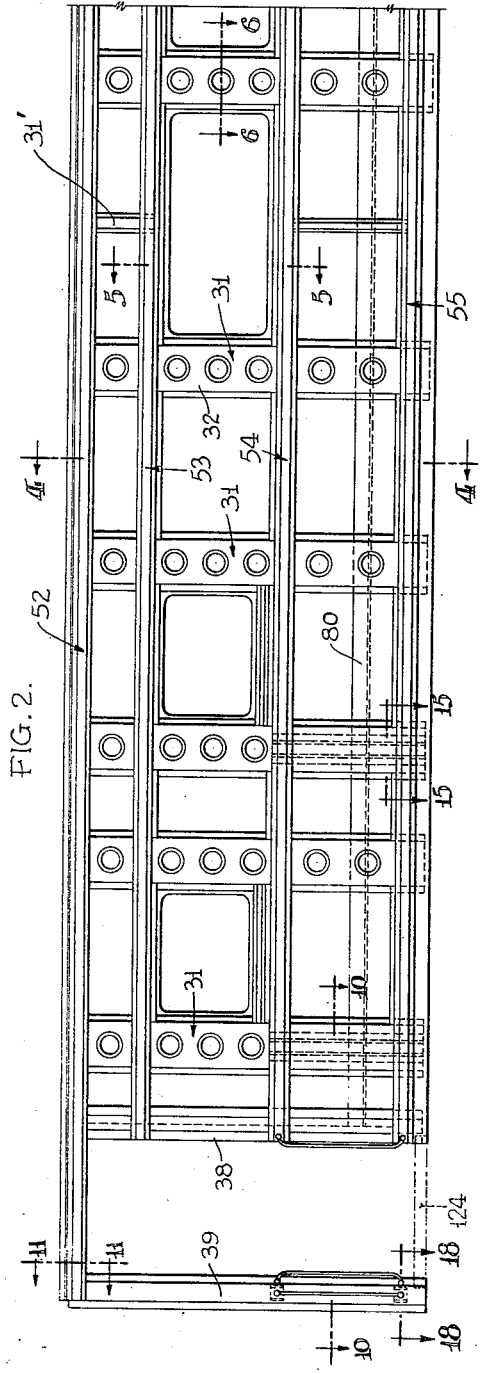
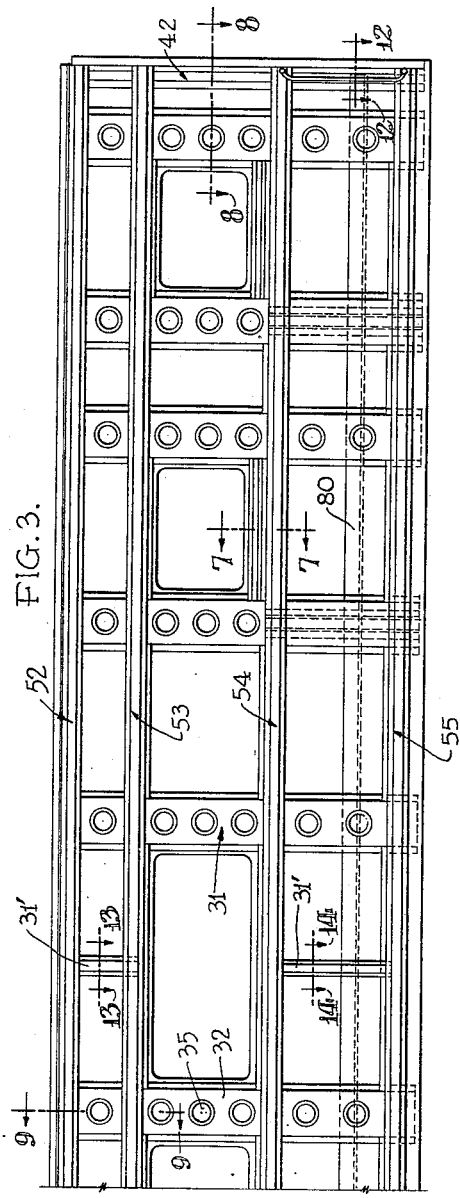
INVENTORS:
Joseph Ledwinka
George Trautvetter.
BY John P. Tarbot
ATTORNEY

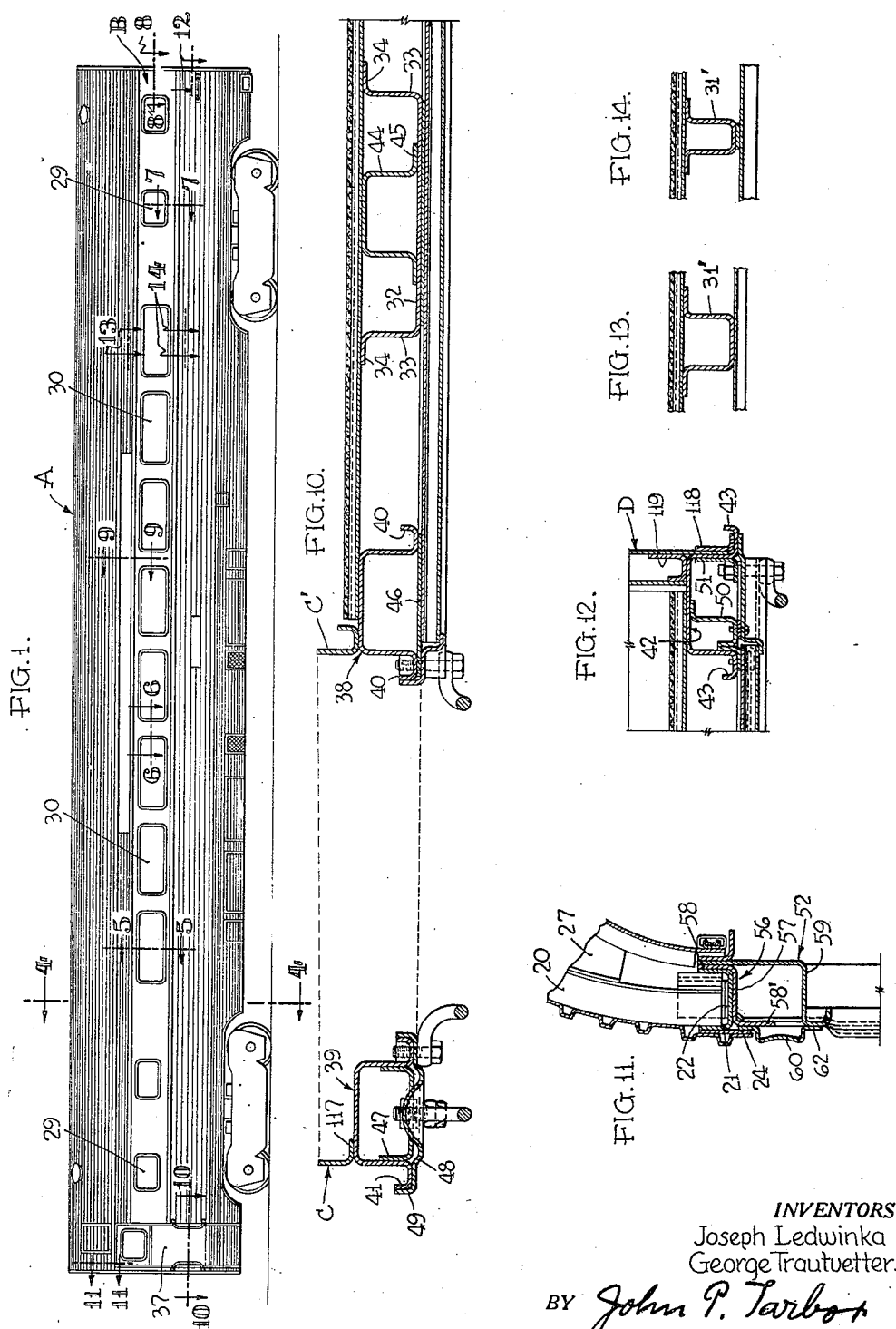

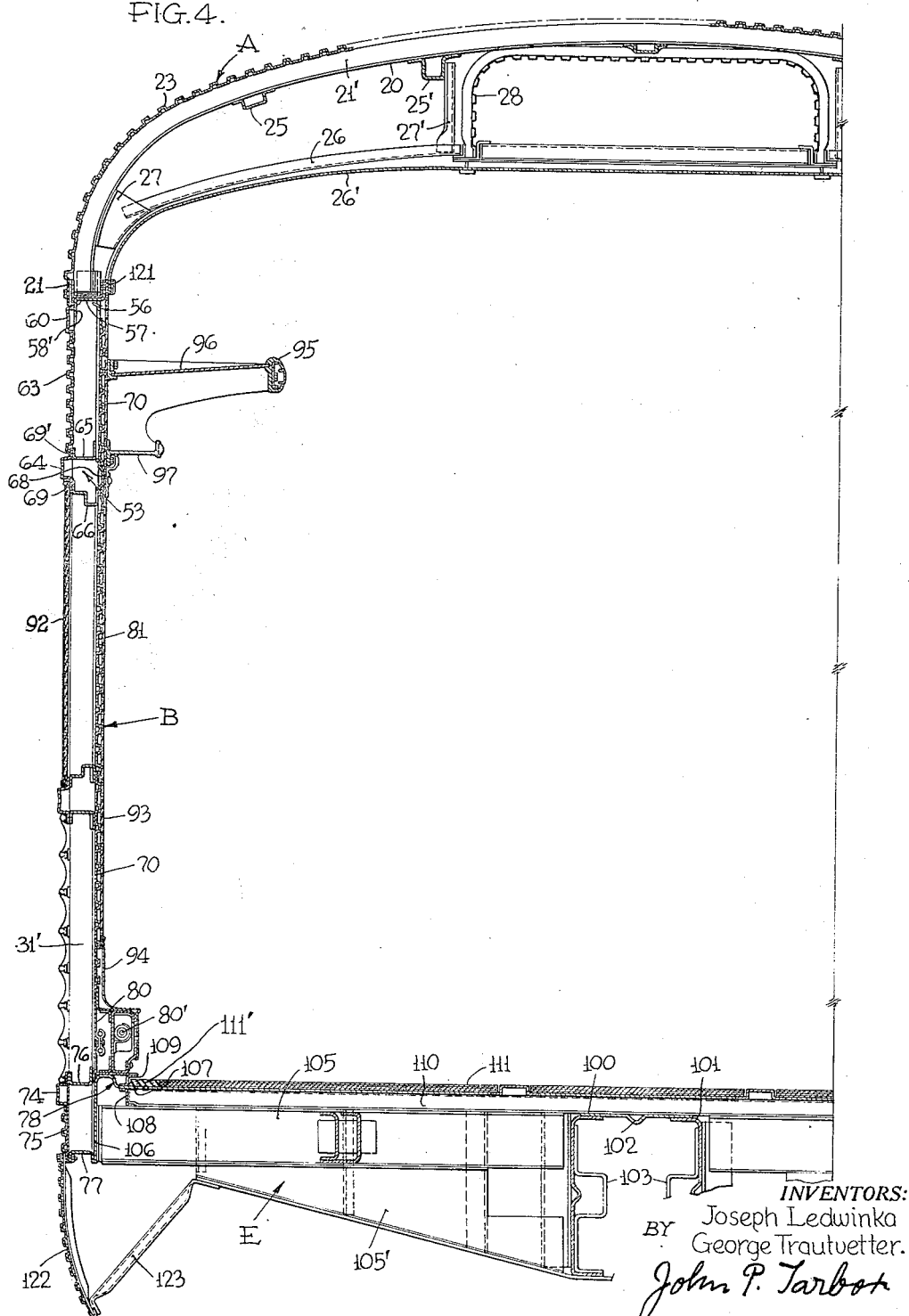

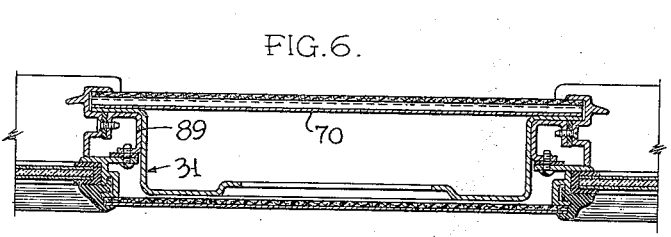
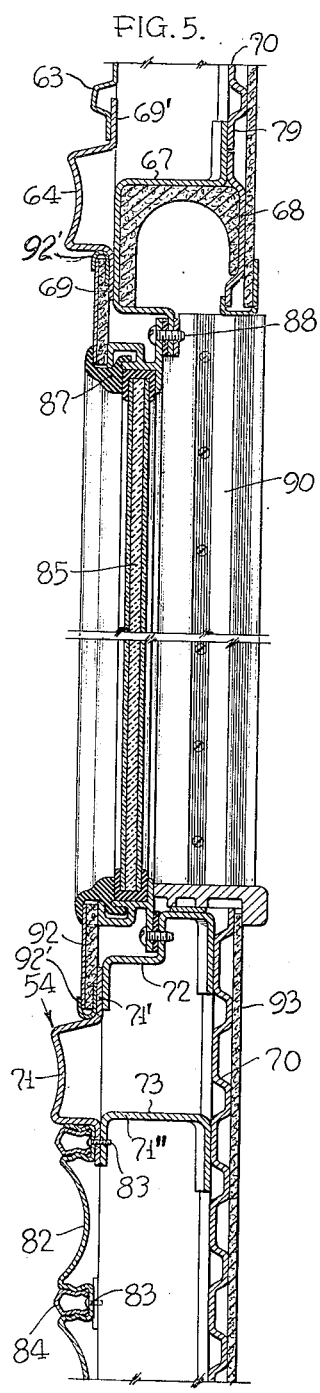
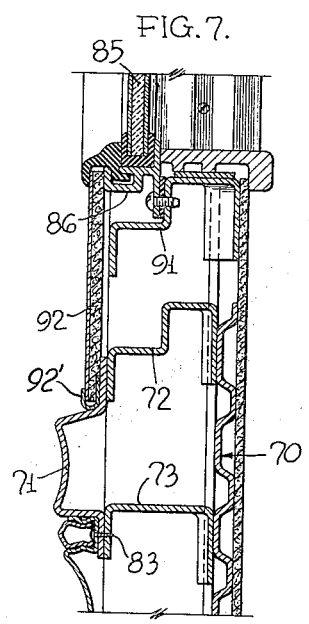
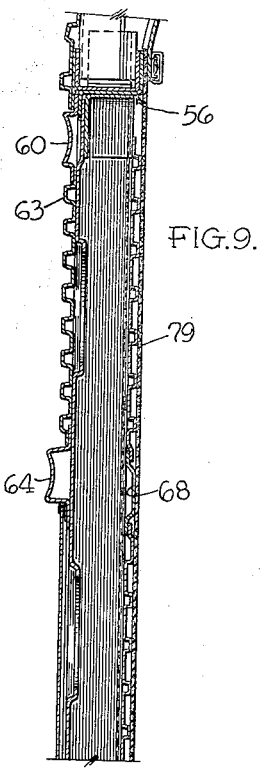
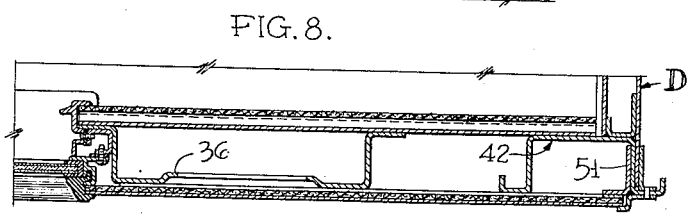
INVENTORS:
Joseph Ledwinka
George Trautvetter
BY John P. Tarbot
ATTORNEY April 29, 1952     J. LEDWINKA ET AL     2,595,212
VEHICLE BODY, ESPECIALLY FOR RAIL CARS
Filed Jan. 15, 1945     5 Sheets-Sheet 5
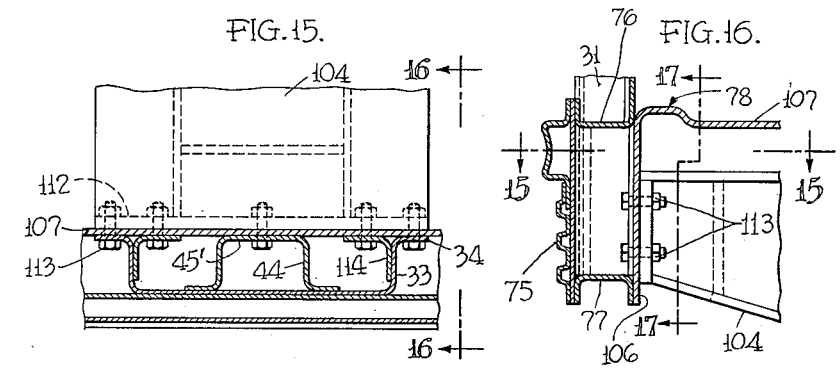
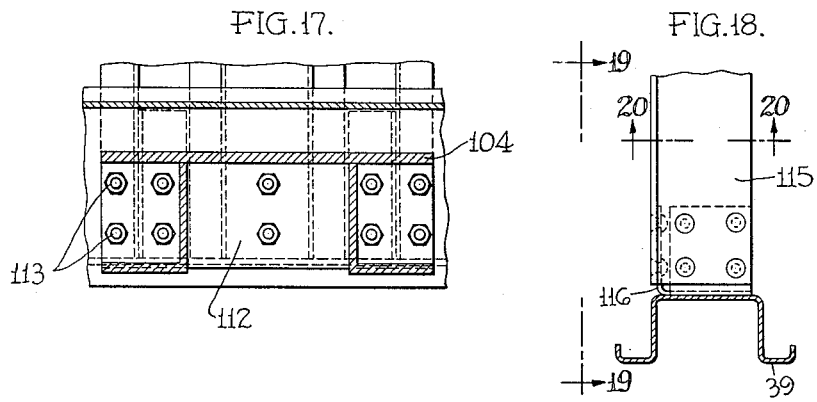
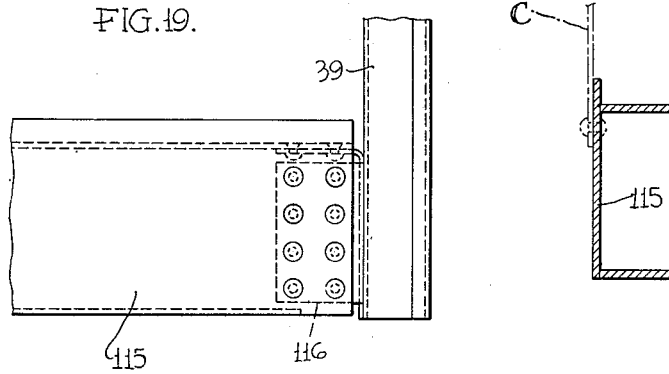
INVENTORS:
Joseph Ledwinka
George Trautvetter.
BY John P. Tarbot
ATTORNEY Patented Apr. 29, 1952

2,595,212

UNITED STATES PATENT OFFICE 2,595,212

VEHICLE BODY, ESPECIALLY FOR RAIL CARS

Joseph Ledwinka, Philadelphia, and George Trautvetter, Jenkintown, Pa., assignors to The Budd Company, a corporation of Pennsylvania Application January 15, 1945, Serial No. 572,774

10 Claims. (Cl. 105—397)

The invention relates to a body construction, especially for rail cars. More particularly, the invention relates to the construction of the side walls of a vehicle body and the connection thereof to adjoining units such as the floor unit, the roof unit and the end wall units.

Among the objects of the invention is a vehicle body which, owing to its construction is of comparatively low weight.

Another object of the invention is a vehicle body which lends itself to the fabrication of its component parts of sheet or strip material preferably (but not exclusively) of stainless steel.

A further object of the invention is a construction, the parts of which are simple in design and easy to manufacture.

Among the objects of the invention is furthermore, a construction the component parts of which, lend themselves to convenient and speedy assemblage by electric spot welding.

A still further object of the invention is a vehicle body composed of a few major assembly units, the marginal portions of which are designed for convenient and speedy connection to the adjoining units by joints of high strength.

The features of the invention by which the aforesaid objects and other objects and advantages are achieved will be more easily understood from the embodiment illustrated in the attached drawing and described in the following.

In the drawing:

Figure 1 is a side elevation of a passenger rail car having a body built in accordance with the invention;

Figure 2 is a side elevation on a larger scale of the left hand side wall portion of the body shown in Figure 1, the outer paneling being removed;

Figure 3 is a side elevation corresponding to Figure 2 yet of the right hand portion of the body shown in Figure 1;

Figure 4 is a fragmentary section on a larger scale substantially along line 4—4 of Figure 1;

Figures 5 through 14 are fragmentary sections on still larger scales taken along the correspondingly numbered lines of Figures 1, 2 and 3;

Figure 15 is a section through one of the posts along line 15—15 of Figures 2 and 16 and a fragmentary plan view of the adjoining transverse underframe bolster;

Figure 16 is an elevational view of the lower end of the post and the outer end of the bolster and a section through the side sill of the underframe along line 16—16 of Figure 15;

Figure 17 is a section through the end of the bolster substantially along line 17—17 of Figure 16;

Figure 18 is a horizontal section through one of the end posts substantially along line 18—18 of Figure 2 showing the adjoining part of the underframe end sill in plan view;

Figure 19 is a fragmentary end elevation viewed in the direction of the arrows on line 19—19 of Figure 18; and Figure 20 is a section along line 20—20 of Figure 18.

The present application is in certain respects a continuation-in-part of applicants' originally co-pending applications "Transparent Window Plate," Serial No. 498,272, filed August 12, 1943, but later abandoned; "Window Construction, Especially for Rail Cars," Serial No. 501,117, filed September 3, 1943, and issued as Patent No. 2,407,086 on September 3, 1946; and "Heater Duct," Serial No. 501,340, filed September 4, 1943, and issued as Patent No. 2,405,839 on August 13, 1946.

The illustrated body comprises a roof unit A, two side wall units B (of which one only is visible in the drawing), end wall units C and D, and an underframe unit E. These units are separately assembled and substantially completely equipped with practically all accessories, such as wiring, trimming, piping, etc., and are then connected to each other into the completed structure. All this will become more clear as the description of the details proceeds.

The roof unit A comprises a plurality of longitudinally spaced carlines 20 of Z-section, the ends of which are secured on either side of the body to an upwardly facing channel-section member 21 by means of bracket members 22 (Figure 11). Longitudinally corrugated sheet metal 23 is secured by spot welding to the outer arms of the carlines 20 and to a marginal reinforcing strip 24 secured to the outer wall of the beam 21.

The carlines 20 are further interconnected by longitudinally extending flanged channel-section members 25, 25', supporting members 26 for the inner roof lining or ceiling finish 26' have their ends supported by brackets 27 and members 27' from the carlines 20 and the longitudinal members 25' respectively. A longitudinally extending tunnel 28 is arranged between the inner ends of the members 26, the upright members 27' and the central portion of the carlines 21. The tunnel 28 serves as an air duct. Insulation, wiring, light fixtures, etc. (not shown) are arranged in the space between the outer roof panel and the ceiling finish or in said duct. All the described accessories are preferably pre-assembled with the roof unit before uniting the roof unit with the side and end wall units.

Each of the side wall units B, comprises a plurality of longitudinal beams or chords, vertical posts or columns, additional reinforcing members in the form of corrugated sheeting, removable paneling and other accessories as described hereinafter.

The small window openings 29 near the ends and the larger window openings 30 in the mid portion of the side wall unit are flanked or separated from each other by vertical columns or posts 31. These columns 31 are shallow inwardly facing channel-section members comprising a bottom wall 32, side walls 33 and marginal flanges 34. The bottom walls 32 are provided with lightening holes 35, the margins of which are reinforced by beadings 36. The opening for the door 37 at the left hand end of the body is flanked by vertical columns or posts 38, 39; these columns are in the form of outwardly facing channels having angle section marginal flanges 40 and 41, respectively. A similar outwardly facing angle section column or post 42 with marginal angle section flanges 43 is provided at the extreme right hand end of the side wall unit.

Above and below the window openings 30 are provided additional braces 31' in the form of inwardly facing flanged sections.

Certain of the posts 31 are reinforced in the interior by outwardly facing flanged channel section members 44 which are secured by their flanges 45 to the bottom wall 32 of the respective column 31 and which extend from the lower ends of the posts to about the lower margin of the windows. The column 38 has its outer side closed by a plate 43 secured to the flanges 40. The end post 39 is reinforced by an inwardly facing channel section member 47 secured by its side walls to the side walls of the member 39. 48 is a cover plate provided with marginal flanges 49 which fit over and are secured to the angle section marginal flanges 41 of the column 39. The post 42 is likewise interiorly reinforced by angle and Z-section brackets 50, 51. Further details of the posts will be described as the description of other elements proceeds.

The posts or columns 31, 38, 39 and 42 and the braces 31' have their upper ends interconnected by a top chord structure 52 and, with the exception of the left hand door pillar 39, they are furthermore connected above and below the window openings 29, 30 and at their lower ends by chord members 53, 54 and 55, respectively.

The upper chord member comprises as a main element thereof a Z-section member 56 having a horizontal web 57 and an upwardly directed inner arm 58 and a downwardly directed outer arm 58'. Above the opening for the door 37 a further Z-section member 59 is connected to the member 56 so as to form therewith a closed box section header.

An outer molding strip 60 extending over the entire length of the body, has its upper marginal flange 61 attached to the outer arm 58 of the Z-section rail. The lower marginal flange 62 of the strip 60 is secured above said door opening to the outer arm of the rail 59 and in all other regions of the car to the margin of a corrugated panel strip 63.

The panel strip 63 closes the space between the molding 60 and a similar molding 64 forming part of the chord member 53 above the window openings. The bottom walls of the corrugations of the panel 63 are secured to the bottom walls of the posts 31 to cover plate 46 of the post 38 and to the in-board flanges 43 of the end post 42.

The chord member 53 above the window opening comprises the above-mentioned outer molding strip 64, between the posts rail members 65, 66 and 67, and an inner molding strip 68. The members 65 and 66 are provided in the region between the posts not occupied by windows 30 and in the region of the small end windows 29. Both members 65 and 66 consist of upwardly facing channels which have their outer walls secured by welding to the lateral flanges 69 and 69' of the molding strip 64 and their inner walls to corresponding flanges of the strip 68. In the region above the large window openings 30, the chord members 67, 68 constitute together a pocket for a roller curtain. The outer wall of the member 67 is welded to the flange 69 of the molding 64.

The chord structure 54 below the window opening consists of a through running molding 71 and short channel-section members 72, 73 inserted between successive posts. The members 72 and 73 are substantially identical with the members 65, 66 of the upper chord 53, except for the feature that they face downwardly, and they are connected by their outer walls to the flanges 71', 71'' of the molding 71 and by their inner walls to an inner panel 70 to be described more fully later on.

The bottom chord structure 55 comprises as members of the side wall unit the rub rail or molding 74, a corrugated panel strip 75, and upwardly facing channel members 76 between the posts. The members 76, 77 are secured to the upper and lower margins of the members 74, 75 by their outer walls. After final assembly of the side wall units and the underframe unit the lower chord structure is completed into closed box-sectional form by a through running downwardly facing channel member 77 passing beneath the lower ends of the posts and forming a unit in itself, and by a rail 78 constituting part of the underframe structure as will be described later on.

In addition to the posts, chords and outer corrugated panels so far described, the side wall units also comprise as main strength members corrugated inner sheet metal paneling of which the lower section 70 had been briefly mentioned hereinbefore. Above and below the window opening the sections 70 and 79 of this paneling extend uninterruptedly between the end posts 38 and 42 and are welded to the bottom walls thereof and are, furthermore, welded to the lateral flanges 34 of the posts 31 and to the bottom walls of the reinforcing members 44 of certain of said posts. The corrugated sheet 70 ends at some distance above the lower chord members 76 and is downwardly continued by one arm of an angle section strip 80. The strip 80 serves as support for the heating equipment 80' which is more fully shown and forms the subject matter of applicants' aforesaid application, Heater Duct, Serial No. 501,340, filed September 4, 1943. The panels 70, 79 are furthermore secured by welding to the inner arms of the chord members 65, 66, 72 and 73. The panel 79 is secured between the window openings to the molding 68 and is terminated short of the upper chord member 66 so as to leave a space giving access to the interior of the wall between the outer panel 63, the inner panel 79 and the chord members 56 and 65. Above the window openings 30, the panel 79 is secured to the inner arm of the members 67.

Between the window openings a further panel 81 is secured to the posts, the molding 68 and the upper margin of the panel 70. Said inner panels 79, 70 and 81 with the strips 68 and 80 form a continuous inner sheeting integrally secured to the posts and chord structures and which performs the functions of the diagonal braces which have hitherto been used in vehicle body constructions of otherwise similar type and size.

On the outside, between the chord members 54 below the window openings and the chord member 55, a fluted panel 82 is removably secured to the flanges of the moldings 71, 74 and the outer walls of the posts such as by screws 83 (Figures 5 and 6) and the connecting means are covered by strips 84 which releasably engage the grooves provided in the panels 82.

The windows 30 show the construction disclosed in applicants' aforesaid Patent No. 2,407,086, "Window Construction, Especially for Rail Cars." The section 86 is secured by screws 88 to offset portions and flanges, respectively of the chord members 67, 72 and of spacer strips 89 nested in the angle formed by the side walls and the flanges of the posts 31. A molding strip 90 is provided on the inside of the window panel 85.

The smaller windows 29 near the ends of the body are similarly constructed and the corresponding parts are provided with the same reference numerals. Here the frame 86 is secured to an additional member 91 arranged between successive posts 31 at some distance above the chord members 72 as shown in Figure 7.

The outside area between the moldings 64 and 71 around the window openings 29 and 30 is covered by a panel 92 held removably in place by the moldings 87 and by channel sections 92' secured to the moldings 64, 71, or by other appropriate means such as screws.

The inside of the side wall is covered by a trim panel 93 which extends from the chord member 56 down to a top member 94 of the heater duct construction and which surrounds the window openings. A baggage rack 95 having an upper shelf 96 for larger luggage and a lower shelf 97 for small articles is secured to the side wall unit B above the window openings.

The underframe unit E comprises a center sill 100 composed of two inwardly facing channels 101, a top plate 102 and inner reinforcing sections 103. Secured to the center sill and the side sills 78 are bolsters 104 and other cross sills 105. Some of the sills 105 are widened by members 105'. Sill 78 has a wide vertical arm 106 and an upper inwardly directed angle section arm 107 which is secured to the top of the sills 105 by Z-section spacers 108. Attached to the top of the arm 107 is another Z-section member 109 having an inwardly directed upper arm. Transversely corrugated sheeting or channel section members 110 are secured to the center sill 100 and the transverse members 104 and carry the floor boards 111. The marginal portions of the floor boards are constituted by removable strips 111'.

The bolsters 105, which may be of welded box-sectional construction, have an end plate 112 on each side and are arranged at the second post from each body end which is reinforced in its interior by a section 44. The end plate 112 is fastened by bolts and nuts 113 to the flanges 34 of the respective post 31, the bottom wall 45 of the reinforcement 44 and to one arm each of angle-section brackets 114 which have their other arm welded to the side walls 33 of the post 31.

The channel-section end sill 115 is secured by a bracket 116 at its end to the bottom wall of the post 39. In the region of this post there is no intervening part of the sill 78 which ends on the other side of the door opening at the post 38.

The end wall unit C has along its outer margin a flange 117 which serves for the attachment to the side wall units B along the bottom wall of the end posts 39. The hollow end wall D at the other end of the body has a marginal angle-section strip 118 and a marginal channel-section strip 119 both of which serve for the connection of the unit D to the flange 43 and the bottom wall, respectively, of the end posts 42. A wall C' similar to the wall C is secured to the bottom wall of the door post 38.

While one side only of the body is illustrated, it will be understood that the body is in general of symmetrical construction on both sides of its longitudinal vertical centre plane.

The roof unit, and still more the underframe unit and the transverse wall units, are only sketchily shown and described because the invention resides mainly in the construction of the side wall units and in the principle of completely equipped subassembly units, as an example for which the side wall may well serve even though the same principle is applicable to the other units as well.

Substantially all the members of the roof, side wall, end wall and underframe units so far described will be pre-assembled with practically all their accessories, insulation, inner and outer trimming, air ducts, heating equipment, wiring, baggage racks, etc., prior to the final assembly of the units with each other. Exceptions are the bottom chord members 77, the lateral marginal portions of the roof and side wall linings 26', 93 and the floor strips 107. The section 77 and the floor strips 112 form units in themselves, and the marginal portions of the linings 26', 93 are left unattached until after the final assembly.

After the described units A, B, C, D and E have been placed in the proper relative position, connection is made in the overlapping regions.

The side wall units B and the roof unit A are connected to each other by welding (or riveting) the rail 21 to the adjoining rail 56. These rails are accessible for welding tools or the like from the interior of the body as long as the margins of the linings 26', 93 are not attached and on account of the space left between the upper margin of the panel 70 and the rail 56. After the connection between the roof and the side wall has been made, the marginal portions of the linings 26' and 93 are attached to the rail 56 and the connecting means are covered by the molding strip 121.

Connection, such as by welding is also made between the arm 106 of the underframe rail 78, on the one hand, and the lateral flanges of the posts 31 and braces 31', and the bottom walls of the posts 38, 42 and of the post reinforcements 44, on the other hand. The ends of the bolster are connected by bolts and nuts as indicated, and the end transverse sill 115 is welded by its bracket 116 to the bottom wall of the post 39. Moreover, the horizontal lower arm of the plate 80 has its margin secured to the flange of the Z-section strip 109. Hereafter the floor strips 112 are put in place and the chord members 77 are inserted and welded by their side walls to the lower margin of the side sills 78 and to the lower margins of the outer panels 75. As long as the strips 77 and 112 are not in place the points of connection are easily accessible for inserting welding or other connecting tools.

The end walls C and D and the vestibule wall C' are secured in place by welding their marginal flanges or strips 117, 117', 119 and 118 to the bottom walls or flanges respectively, of the posts 39, 38 and 42. Connection is of course also made between the transverse walls on the one hand and the underframe and the roof units on the other hand, but these details are not shown.

After the final assembly of the car further accessories are attached, such as the skirts 122 which are removably secured to the lower chord structure 55 and to braces 123 forming part of the transverse members 105, 105'.

The dot and dash lines 124 in Figure 2 indicate an auxiliary member which is temporarily inserted between the lower ends of the posts 38, 39 flanking the door opening so as to allow handling of the side wall units without the danger of bending or dislocating the outer post 39. This temporary brace is removed when connection between the side units and the underframe unit is about to be made or has been made.

While one specific embodiment of the invention has been shown and described, it should be understood that the invention is not restricted to the details of such embodiment but that it is intended to protect the invention in accordance with the language and the spirit of the attached claims.

What is claimed is:

1. In a vehicle body, such as a railway passenger car body, having side walls with window openings and a roof, a skeleton framework of horizontally, longitudinally extending chord structures vertically spaced from each other and of vertical posts and carlines horizontally spaced respectively from each other; inner side wall panellings integrally and permanently secured to the inner sides of said structures and posts for forming main structural stress-transmitting members of said walls which also diagonally brace said structures and posts; an outer panelling removably attached such as by screws to the outsides of said side wall framework, so as to constitute a mere trim cover, and, at least in large part, coextensive with said inner panel; and above the window openings the side walls and the roof having outer panellings integrally and permanently secured to said chord structures, posts, and carlines.

2. In a vehicle body side wall provided with window openings and constituting a main load supporting member of the body, a plurality of horizonally arranged and vertically spaced chord structures integrally connected to a plurality of vertically arranged and horizontally spaced posts, an inner panelling extending around said openings and integrally connected to the inner faces of said chord structures and posts so as to form a main stress transmitting element diagonally bracing said structures and posts against each other, and an outer panelling at least in part removably secured to said chord structures and posts.

3. Side wall for vehicle bodies provided with window openings having their upper margin spaced from the upper margin of the side wall, said side wall comprising a skeleton frame work of longitudinally extending chord structures and of vertical posts, one chord structure being arranged along the upper margin of the side wall and another chord structure along the upper margin of the window openings, an inner panelling integrally connected to said chord structures and posts and surrounding said window openings, an outer panelling integrally connected to said posts and to the chord structures arranged along the upper margin of the side wall and the window openings, a further outer panelling removably connected to said chord structures and said posts below the chord structure along the upper margin of the window openings.

4. Side wall for vehicle bodies, especially for passenger railway car bodies, comprising a skeleton framework of longitudinally extending chord structures and of vertical posts, one chord structure being arranged along one longitudinal margin of the side wall and another chord structure at a short distance therefrom, an inner and an outer panelling integrally and permanently connected to at least one of said two last specified chord structures and to said posts so that both constitute structural members of the wall, a further outer panelling removably connected, such as by screws, to said chord structures and said posts adjacent said integrally connected outer panelling.

5. In a vehicle body side wall, integrally connected vertical posts and longitudinally extending chord structures, one of these chord structures being arranged substantially along one of the longitudinally extending margins of the side wall and another chord structure at a short distance from said margin, an inner panel integrally secured to said posts and said chord structures so as to constitute a stress transmitting element of the side wall and another panel integrally secured to the outside of the posts and to said chord members arranged along and at a short distance from the one margin of the side wall whereas the adjoining part of the outside of the side wall is covered by a removable panel.

6. In a vehicle body side wall, vertical posts integrally interconnected by longitudinal chord structures and an inner stress transmitting panel, one of said chord structures comprising longitudinally extending members arranged at a short distance above the lower ends of the posts and an outer panel integrally connected to said posts and said members beneath the latter, the inner side of the posts below said members being left free of the inner panel, an adjoining underframe unit having a side sill with a high vertical web to which are attached the lower ends of the posts in the region beginning at and extending downwardly from said members, and a closing section arranged beneath the lower ends of the posts, and connected to the lower margins of said outer panel and said web so that it forms with said members and web a closed box-section chord structure.

7. In a vehicle body, such as for railway cars, a skeleton framework comprising vertical posts of shallow inwardly facing channel-section provided with flanges along the margins of its side walls which extend generally parallel to its bottom wall, an inner panel integrally and permanently secured to the lateral flanges of the channel-section so that posts of closed box-sectional shape are attained, said panel interconnecting and diagonally bracing said posts, and an outer panel which, at least in part, is removably secured, such as by screws to the bottom walls on the outside of said posts.

8. Side wall for vehicle bodies comprising a skeleton framework of longitudinally extending chord structures and of vertical posts, one chord structure being arranged along one longitudinal margin of the side wall and another chord structure at a short distance therefrom, an inner and an outer panelling integrally and permanently connected to at least one of said two last specified chord structures and to said posts, a further outer panelling removably connected to said chord structures and said posts adjacent said integrally connected outer panelling, said inner panelling ending short of the marginal chord structure so as to leave a narrow space giving access to the interior of the hollow wall for the purpose of inserting insulation and for connecting the outer and inner panelling to the posts and the chord structures, and for facilitating the connection with an adjoining structure.

9. In a vehicle body side wall unit provided with window openings, a plurality of posts and a plurality of chord structures, one each along the upper margin and the lower margin of the unit and along the upper and lower margins of the window openings, an inner panel in the form of longitudinally corrugated sheet metal integrally connected to said chord structures and to said posts, an outer longitudinally corrugated sheet metal structure integrally connected to the chord structure between the upper margin of the unit and the upper margin of the window openings, a removably secured outer panel around said window openings between the chord members along the upper and lower margins of the window openings and another removable outer panel between the chord structures along the lower margins of the window openings and of the side wall unit.

10. In a vehicle body such as for rail cars, a longitudinally wide and transversely thin side wall post of channel-section facing inwardly and provided with lateral marginal flanges, a second channel-section member of smaller width than the post but of nearly the same thickness provided with lateral flanges and fastened by the latter to the inside of the bottom wall of the post, the flanges of the post and the bottom wall of the second member presenting means for the attachment of an adjoining structure, such as a bolster beam, to the side wall, said second member extending over part of the length of the post from the point destined for the attachment of an adjoining body structure so as to distribute stresses originating with the adjoining structure over a wide area of the side wall.

JOSEPH LEDWINKA.
GEORGE TRAUTVETTER.

REFERENCES CITED

The following references are of record in the file of this patent:

UNITED STATES PATENTS

| Number | Name | Date |
|---|---|---|
| 1,031,060 | Gibbs | July 2, 1912 |
| 1,432,223 | Voss | Oct. 17, 1922 |
| 2,100,568 | Norris | Nov. 30, 1937 |
| 2,150,130 | Ragsdale et al. | Mar. 7, 1939 |
| 2,243,373 | Crites | May 27, 1941 |
| 2,250,523 | Christiansen et al. | July 29, 1941 |
| 2,294,357 | Dean et al. | Aug. 25, 1942 |
| 2,476,451 | Murphy et al. | July 19, 1949 |

FOREIGN PATENTS

| Number | Country | Date |
|---|---|---|
| 128,994 | Great Britain | Mar. 15, 1918 |

OTHER REFERENCES

Page 24 of the text material of the January 1930 issue of The Railway Engineer.